United States Patent [19]

Wilding

[11] Patent Number: 4,718,541
[45] Date of Patent: Jan. 12, 1988

[54] TOBACCO FEEDER WITH SLAT CONVEYORS

[76] Inventor: Edwin L. Wilding, 10210 Garlanreid Pl., Louisville, Ky. 40223

[21] Appl. No.: 793,982

[22] Filed: Nov. 1, 1985

[51] Int. Cl.$^4$ .............................................. B65G 15/42
[52] U.S. Cl. .................................. 198/699.1; 198/845
[58] Field of Search ...................... 198/699.1, 845, 851, 198/838, 849, 692

[56] References Cited

U.S. PATENT DOCUMENTS

| | | |
|---|---|---|
| 614,847 | 11/1898 | Dick . |
| 1,146,866 | 7/1915 | Graper ................. 198/699.1 |
| 1,462,427 | 7/1923 | Sterret . |
| 1,710,883 | 4/1929 | Llewellyn et al. . |
| 1,769,992 | 7/1930 | Furbush . |
| 1,794,182 | 2/1931 | Kunz . |
| 1,883,528 | 10/1932 | Buck . |
| 2,045,957 | 6/1936 | Loose . |
| 2,222,025 | 11/1940 | Fischer ................. 198/851 |
| 2,746,595 | 5/1956 | Kornylak . |
| 2,810,467 | 10/1957 | Bogaty ................. 198/692 |
| 2,987,167 | 6/1961 | Franz . |
| 2,987,168 | 6/1961 | Franz . |
| 3,034,638 | 5/1962 | Franz . |
| 3,044,604 | 7/1962 | Steigleder . |
| 3,082,861 | 3/1963 | Kornylak ................. 198/838 |
| 3,083,810 | 4/1963 | Zebarth et al. ................. 198/836 |
| 3,123,202 | 3/1964 | Stevens . |
| 3,174,618 | 3/1965 | Wesson . |
| 3,194,388 | 7/1965 | Wulff ................. 198/845 |
| 3,259,228 | 7/1966 | Wilding . |
| 3,407,918 | 10/1968 | Clarke ................. 198/699.1 |
| 3,934,712 | 1/1976 | Jende ................. 198/851 |
| 4,326,626 | 4/1982 | Brockwell . |

Primary Examiner—Joseph E. Valenza
Assistant Examiner—D. Glenn Dayoan
Attorney, Agent, or Firm—Wood, Herron & Evans

[57] ABSTRACT

A tobacco feeder for elevating bulk tobacco from a lower level input station to a higher level discharge station including a hopper conveyor and a feed conveyor each having a plurality of abutting conveyor slats movable with drive chains along a horizontal run and an inclined run, respectively. The conveyor slats include a planar top surface and integral forward and rearward legs bent at an included angle of less than 90° but greater than 0° with respect to the top surface forming convexly arcuate longitudinal edges. In order to stiffen the conveyor slats, a reinforcing slat is preferably mounted to each conveyor slat, and provides a slat assembly which has pronounced resistance to bending. Alternatively, a roller is mounted beneath the conveyor slat which is movable along a support to prevent bending of the conveyor slats, or a partial reinforcing slat is provided for riding on an elongated support.

5 Claims, 8 Drawing Figures

TOBACCO FEEDER WITH SLAT CONVEYORS

BACKGROUND OF THE INVENTION

This invention relates to tobacco feeders, and, more particularly, to slat conveyors for use in a tobacco feeder.

Tobacco feeder machines are utilized to elevate tobacco in bulk quantities from a low level input or dump station to a higher level discharge station at an accurate volumetric rate. Bulk tobacco feeders generally include a lower or hopper conveyor at the input station onto which the tobacco is loaded for movement along a substantially horizontal run to an inclined feed conveyor. The feed conveyor moves the tobacco from a pick-up station at the end of the hopper conveyor to an elevated position for further processing. In order to limit the overall length of the tobacco feeder, the feed conveyor follows a steeply inclined run from the hopper conveyor to the discharge station at the upper level.

The conveying surfaces of both the feed and hopper conveyors of prior art bulk tobacco feeders are conventionally a rubber or rubberized belt. The continuous, rubberized surface of the belt frictionally engages the tobacco to help move it along the conveyor runs, and the belt also prevents smaller particles and fines of the tobacco from dropping out of the feeder machine.

One problem with tobacco feeders employing a rubberized belt is that the belts have a useful life of only two to eight years, depending on the extent of use. The remaining elements of the tobacco feeders last much longer, and therefore the rubberized belts must be replaced many times over the life of the feeder creating maintenance problems, interruptions of production for belt replacement and additional expense. Moreover, the rubberized belts may become contaminated with bacteria from the tobacco, and it has proven difficult to thoroughly wash down the belts after use.

Slat conveyors, which employ a plurality of adjoining, transverse metal slats to form a conveying surface, have been proposed as a replacement for rubber belts in tobacco feeders as discussed, for example, in U.S. Pat. No. 3,259,228 to Wilding. The advantage of using metal slats instead of a rubberized belt is that the slats last about as long as the feeder machine and need not be replaced. However, other problems are created. The metal slats form a smooth conveying surface along which the bulk tobacco can slide as it moves up the steeply inclined run of the feed conveyor of a tobacco feeder. In addition, individual adjoining slats of prior art slat conveyors often do not tightly abut one another, creating gaps therebetween. Fines and other small particles of tobacco placed on such conveyors can either pass through the gaps between adjoining slats or accumulate therein requiring a great deal of cleaning to maintain the surrounding equipment clear of particles.

Also, where slats are of substantial length, such as 6 or 8 feet or more, the tobacco load tends to bend them out of shape.

SUMMARY OF THE INVENTION

It is therefore among the objects of this invention to provide a tobacco feeder having slat conveyors for the horizontal and inclined runs of the feeder.

It is another object of this invention to provide a hopper conveyor and an inclined feed conveyor for a tobacco feeder each having a plurality of slats which are shaped to tightly abut one another to avoid the formation of gaps therebetween in which tobacco particles can collect or pass through.

It is a further object herein to provide a tobacco feeder having an inclined feed conveyor formed of a plurality of abutting slats which includes means for engaging the tobacco for movement up a steeply inclined run and for maintaining an accurate volumetric flow of tobacco.

It is still a further objective to provide improved slats for a tobacco feeder.

These objects are accomplished in a tobacco feeder having a hopper slat conveyor movable between an input station and a pick-up station along a generally horizontal run, and a feed slat conveyor movable along an inclined run between the pick-up station and a discharge station. The hopper and feed conveyors of this invention each include opposed, endless conveyor chains movable between spaced rollers having sprockets at opposite ends. Abutting, transverse conveyor slats extend laterally across the tobacco feeder along both the horizontal and inclined runs and are mounted at their ends to the chains for movement therewith. Each of the slats include a top conveying surface and integral forward and rearward legs. The legs are each bent out of the plane containing the top conveying surface of the slat forming longitudinally extending, convexly arcuate edges. Preferably, both the forward and rearward legs form an included angle with respect tot he top surface of less than 90° but greater than 0° so that the legs stiffen the slats to resist bending under load.

Each of the chains are formed with spaced, inwardly extending tabs which mount opposite ends of the slats at a precise location therealong to maintain the arcuate longitudinal edges of adjacent slats in closely abutting relationship with a gap therebetween of preferably about 0.011 of an inch, up to about 0.030 inch. This small gap between adjacent slats is maintained by the precision mounting of the tabs to the chains, and the close manufacturing tolerances in the fabrication of the slats, to minimize the fines or other small particles of tobacco from lodging between the slats, or falling therethrough. The abutting slats therefor form essentially continuous conveying surfaces along both the hopper conveyor and feed conveyor.

The bulk tobacco is moved by the hopper conveyor from the dump station to the pick-up station at the base of the feed conveyor. In order to move the tobacco along the steeply inclined run of the feed conveyor, forming an angle of about 45°–70° relative to a vertical plane, each of the slats of the feed conveyor includes upstanding pins mounted to their top conveying surfaces. The pins grip the tobacco like a rake so that it is moved upwardly from the pick-up station of the hopper conveyor with minimum slippage.

The slats forming the conveyors of this invention are preferably stainless steel and have an expected useful life comparable to that of the tobacco feeder machine. This greatly reduces the maintenance and down time associated with replacing rubberized belts used on prior art tobacco feeders. In addition, the slat conveyors of this invention each provide an essentially continuous conveying surface wherein the gaps between adjoining slats are held to close tolerances and resist accumulation of fines and other small particles from the tobacco moving therealong. This permits full wash down of the conveyors, resulting in cleaner overall operation of the feeder machine.

In order to further stiffen and improve the conveyor slats, a reinforcing slat is preferably mounted to each of the conveyor slats. In one presently preferred embodiment, the reinforcing slats are formed in essentially the same configuration as the conveyor slats with a horizontal surface connected to integral forward and opposed legs bent toward one another at an angle relative to the horizontal surface. The reinforcing slats are turned upside down, so that the legs face upwardly, and are then slide into engagement with a conveyor slat from one end so that the legs of both slats engage one another and the top surface of the conveyor slat is spaced above and parallel to the horizontal surface of the reinforcing slat. The slats are bolted together to form a box-like structure which resists bending under heavy loading, and which tends to lock together even more tightly as loads increase to resist slat deformation.

In an alternative embodiment, the conveyor slats may be stiffened by a support roller mounted to the top surface of each conveyor slat and extending downwardly therefrom into engagement with a fixed channel or other support mounted to the feeder housing. The rollers are movable along the channel with the movement of the conveyor slats and resist bending thereof to accommodate heavy loads with less power requirements.

In a further alternative, a sliding slat comprising an inverted slat of short length is mounted to an upper slat for sliding along a support and keeping the conveyor slat to which it is attached from excessive deflection.

DESCRIPTION OF THE DRAWINGS

The structure, operation and advantages of a presently preferred embodiment of this invention will become further apparent upon consideration of the following description taken in conjunction with the accompanying drawings wherein.

DETAILED DESCRIPTION OF THE INVENTION

Figure 1:
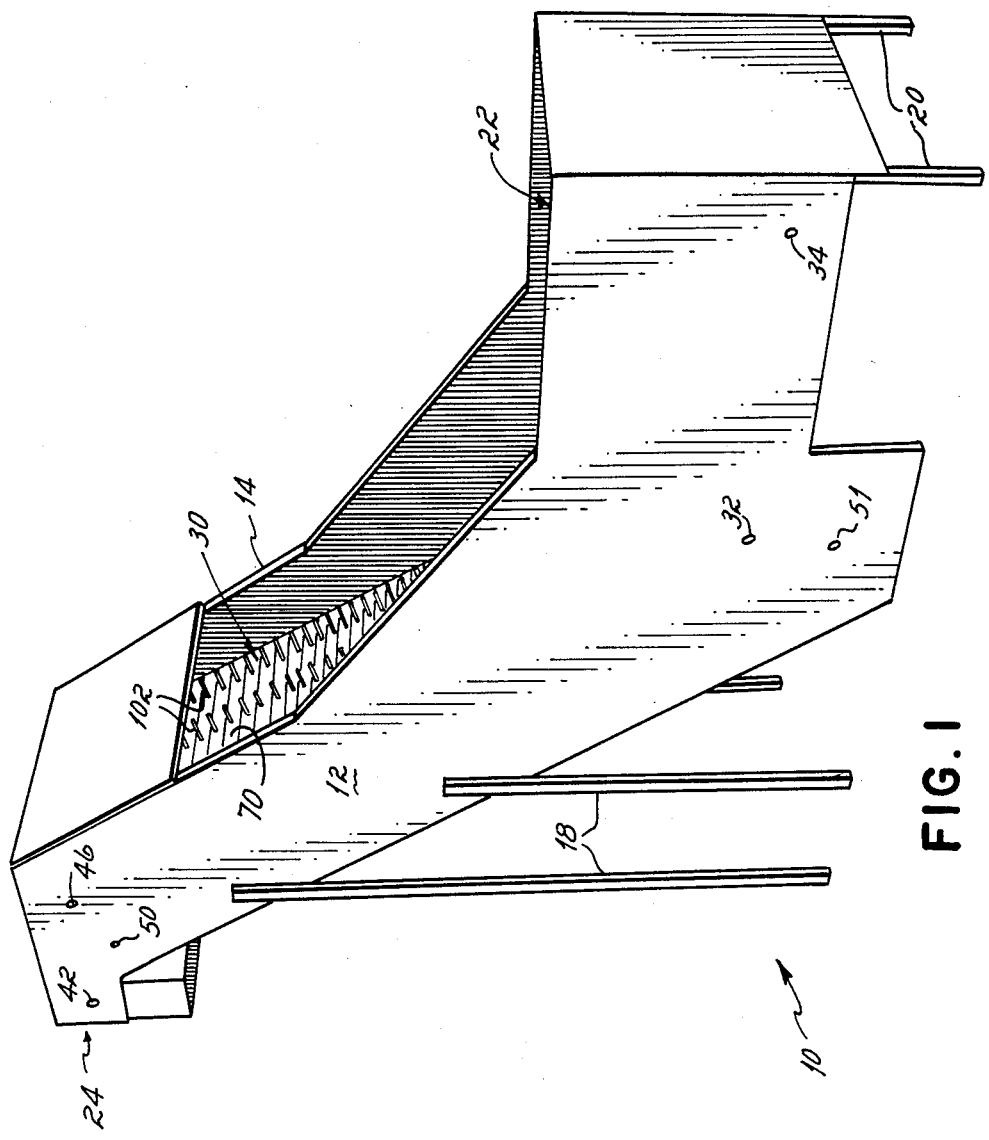
FIG. 1 is a perspective view of a tobacco feeder having slat conveyors according to this invention.

Referring now to the drawings, the tobacco feeder 10 of this invention includes spaced, upright side panels 12, 14 connected to internal frame structure (not shown), which are supported by front and rear legs 18, 20, respectively. The space between side panels 12, 14 ranges from about two feet to sixteen feet, and typically may be of from 6 to 8 or 10 feet. The height of the tobacco feeder 10 from its lower level dump or input station 22, to a higher level discharge station 24, can be widely varied according to space and material handling requirements of a particular application.

The function of tobacco feeder 10 is to transport bulk quantities of tobacco from the low level input station 22 to a high level discharge station 24 where the tobacco is discharged at an accurate volumetric feed rate for further processing. The tobacco is transported from the lower to higher level by two conveyors. A lower or hopper conveyor 26 moves the tobacco along a generally horizontal run between the low level input station 22 and a pick-up station 28. An upper or feed conveyor 30 then moves the tobacco along a steeply inclined run of 55°-70° relative to the vertical, from the pick-up station 28 to the elevated discharge station 24.

Figure 2:
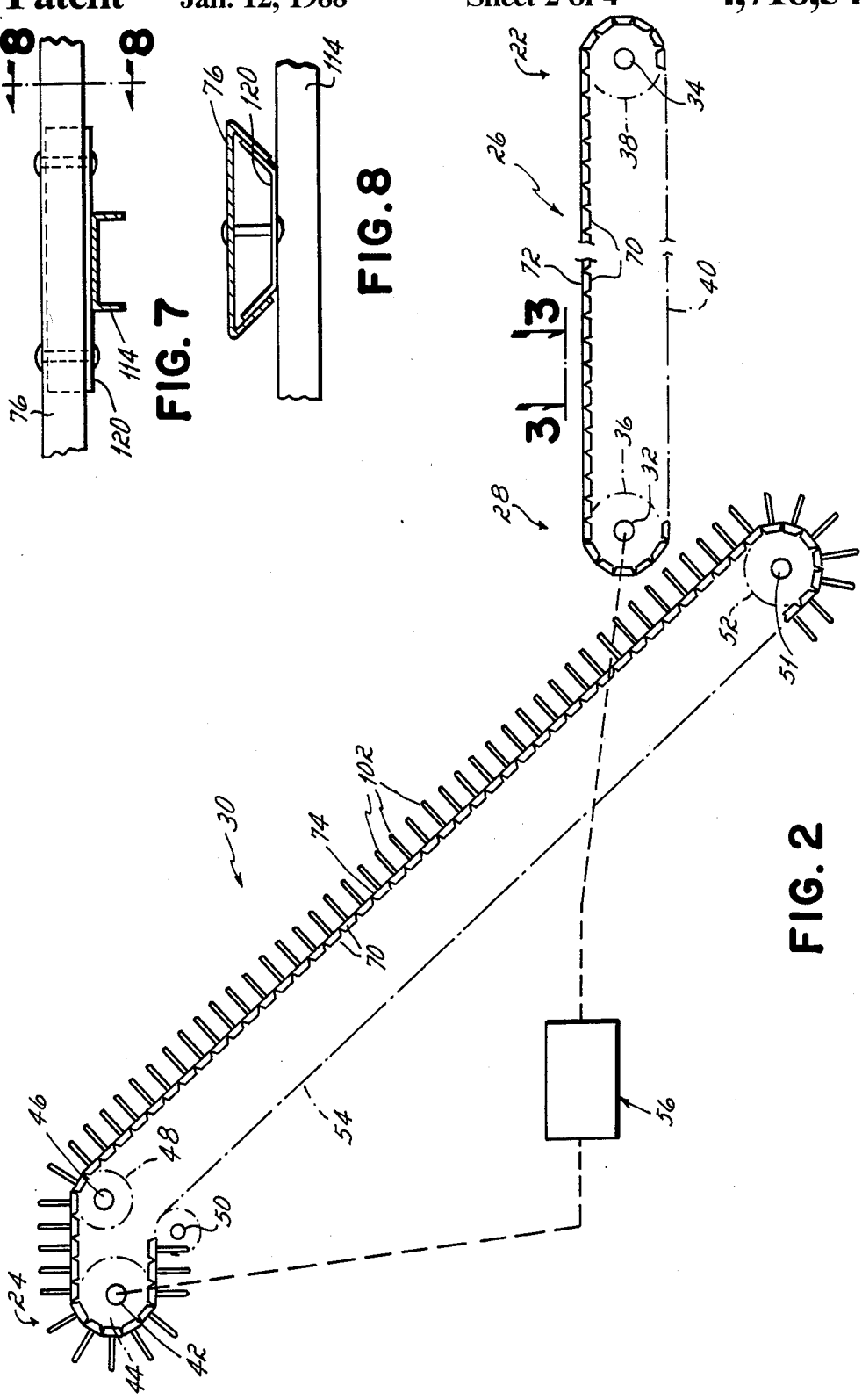
FIG. 2 is a schematic view of the inclined feed conveyor and hopper conveyor herein.

Referring now to FIG. 2, hopper conveyor 26 includes a drive roller 32 disposed at the pick-up station 28 and an idler roller 34 positioned at the input station 22. The drive roller 32 includes a sprocket 36 at each end which align with a sprocket 38 mounted at each end of the idler roller 34. An endless chain 40 is looped around each sprocket pair 36, 38 for movement with the rotation of rollers 32, 34.

The feed conveyor 30 extends between the pick-up station 28 and discharge station 24 for elevating the tobacco from a position near the floor to a position several feet above for further processing. The feed conveyor 30 includes a drive roller 42 having a sprocket 44 at each end, which is disposed at the discharge station 24. An idler roller 46 having opposed sprockets 48 is rotatably mounted to the side panels 12, 14 in the same horizontal plane as drive roller 42 forming a short, horizontal run at the discharge station 24. A second idler roller 50, spaced below rollers 42, 46 at the discharge station 24 is provided for purposes to become apparent below. A return idler roller 51, having a sprocket 52 at each end, is journaled to the side panels 12, 14 in the area of pick-up station 28. Extending between the aligning sprockets 44, 48, 52 of rollers 42, 46 and 51, respectively, are a pair of endless chains 54.

The chains 54 of feed conveyor 30 and chains 40 of hopper conveyor 26 are movable with the drive rollers 42, 32, respectively, which are driven by a motor 56 shown schematically in FIG. 2. The means drivingly connecting motor 56 to the drive rollers 32, 42 forms no part of this invention and is conventional in tobacco feeders of the type illustrated in the drawings.

Figure 3:
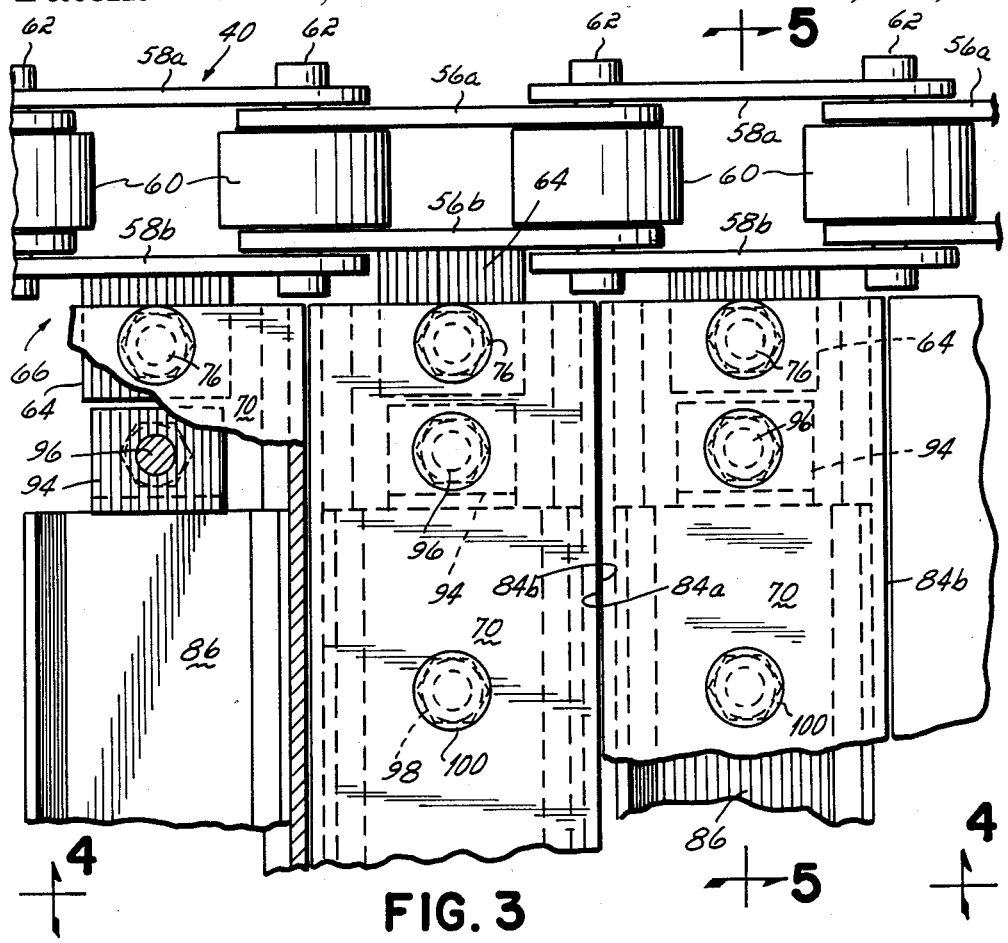
FIG. 3 is a plan view of the hopper conveyor showing the connection between the drive chains and conveyor slats.

Referring now to the upper portion of FIG. 3, one of the chains 40 of hopper conveyor 26 is illustrated. It should be understood that the other chain 40, and the chains 54 of feed conveyor 30 are identical. The chain 40 includes parallel, inner side plates 56a,b connected at their ends to parallel, outer side plates 58a,b by a conventional roller 60 and pin 62 connection. A series of mounting tabs 64 are connected to the inwardly facing side 66 of chain 40 for purposes to become apparent below. As shown in FIG. 3, the mounting tabs 64 are alternately attached to an outer side plate 58b and an inner side plate 56b along the inwardly facing side 66 of the chain 40.

The hopper conveyor 26 and feed conveyor 30 each include a plurality of transverse, abutting conveyor slats 70 which extend laterally across the width of tobacco feeder 10 between its side panels 12, 14. The slats 70 of hopper conveyor 26 form an essentially continuous, horizontal conveying surface 72, and the slats 70 of feed conveyor 30 form an essentially continuous inclined conveying surface 74.

Figure 4:
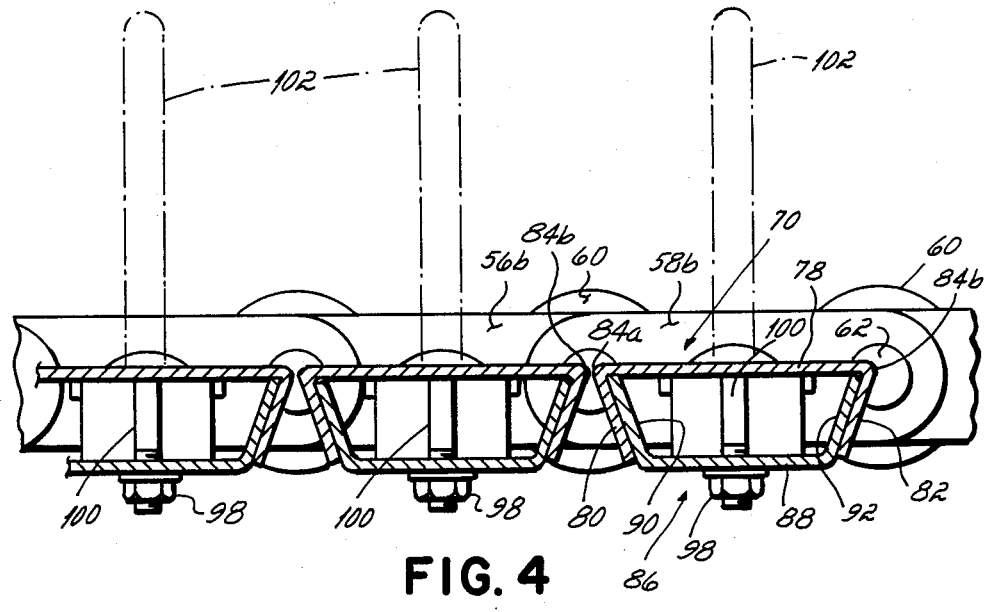
FIG. 4 is an end view taken generally along line 4—4 of FIG. 3 showing the conveyor slats and reinforcing slats.

Referring now to FIGS. 3 and 4, the conveyor slats 70 of hopper conveyor 26 are shown, which are substantially identical to the conveyor slats 70 of feeder conveyor 30. The conveyor slats 70 are connected at each end by bolts 76 to the mounting tabs 64 connected to chains 40. The conveyor slats 70 are mounted in the identical fashion to the chains 54 of feed conveyor 70. Each of the slats 70 is preferably formed of 12-gauge stainless steel in the general shape of a U having a planar top surface 78 and integral forward and rearward legs 80, 82, respectively. The legs 80, 82 are bent out of the plane of the top surface 78 and inwardly toward one another. The legs 80, 82 form an included angle with the plane of the top surface 78 of slats 70 of less than 90° but greater than 0°, which adds stiffness to the top surface 78 under load. Preferably, the forward and rearward legs 80, 82 are bent so as to form longitudinally extending, convex arcuate edges 84a, b on either side of the top surface 70 of slat 74.

As shown in FIGS. 2-4, the convex edges 84a, b of adjacent slats 70 abut one another to form essentially continuous conveying surfaces 72, 74 for the hopper conveyor 26 and feed conveyor 30, respectively. Preferably, the space between adjacent slats 70 is in the range of approximately 0.011 to 0.030 of an inch. The location of abutting slats 70 along chains 40, 52 is carefully controlled by maintaining close tolerances in the manufacture of slats 70, and also by precisely positioning the mounting tabs 64 along chains 40, 54. By maintaining a very small gap between adjacent slats 70, fines or other small particles from the tobacco are prevented from accumulating therebetween or falling therethrough.

Figure 5:
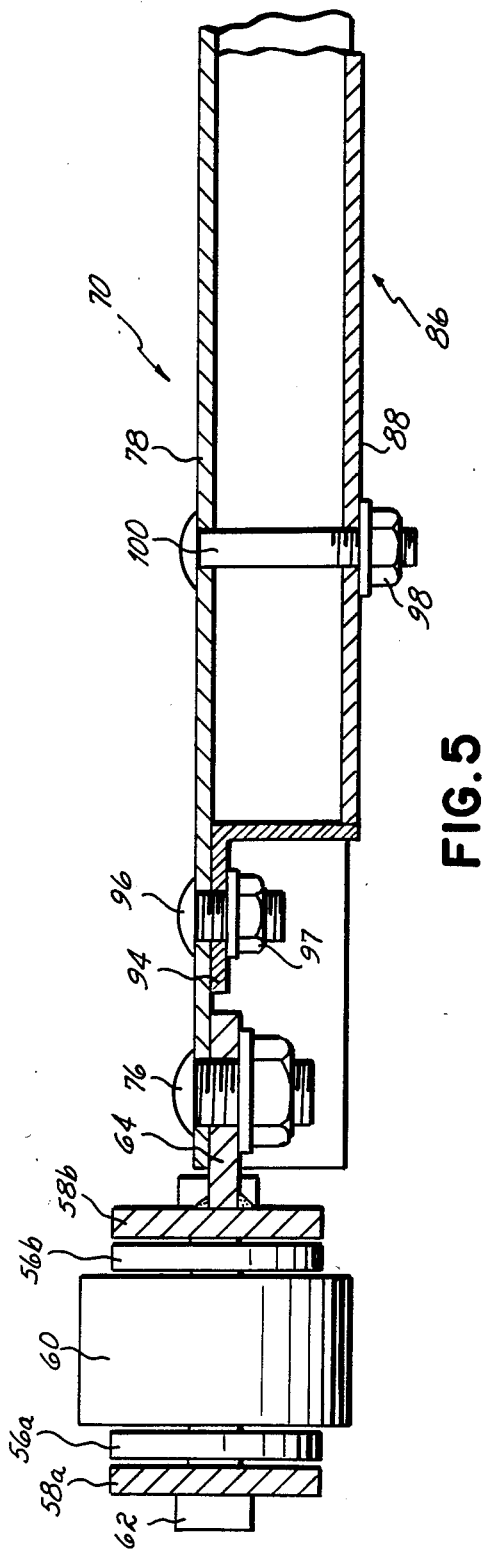
FIG. 5 is a cross-sectional view taken generally along line 5—5 of FIG. 3 showing the connection between the conveyor slats and reinforcing slats herein.

It has been found desirable, particularly for heavy loading and wide feeders, to further reinforce or stiffen the slats 70 to resist bending and wear. Referring now to FIGS. 4 and 5, one embodiment of a means for stiffening the slats 70 is illustrated. A reinforcing slat 86 is formed in essentially the same configuration as slats 70 with a planar horizontal surface 88 and integral forward and rearward legs 90, 92, respectively, which are bent outwardly away from one another at an angle relative to horizontal surface 88. The reinforcing slat 86 is turned upside-down so that its horizontal surface 88 is spaced from the top surface 78 of slats 70, and then slide into engagement with the conveyor slat from one end so that the legs 90, 92 of the reinforcing slat 86 engage the forward and rearward legs 80, 82 of the conveyor slats 70. As shown in FIG. 4, this forms a box-shaped member in which the horizontal surface 88 of reinforcing slat 86 is spaced below and parallel to the top surface 78 of the conveyor slats 70.

The particular combination of the slat 70, with the reinforcing slat 86, provides a uniquely reinforced slat which tends to increase resistance to bending as the load is increased. Turning to FIG. 4, it will be appreciated that as loads are placed on the slat 70, it tends to bend in the middle. This tends to cause the legs 80, 82 to bend upwardly where they grip legs 90, 92 of reinforcing slat 86. Such gripping increases the stiffness of the slat assembly.

Moreover, any bending of the assembly tends to bend outwardly legs 90, 92 of the reinforcing slat 86, which further grips legs 80, 82 of slat 70. This further increases the stiffness of the overall slat assembly. Accordingly, the reinforced slat assembly, including slats 70 and 86, tends to increase its stiffness and resistance to bending as the load is increased. This significantly retains straight slat edges and minimizes flexing or between slat openings which may admit fines between the slats.

An end clip 94 is provided at each end of the reinforcing slats 86 and is connected by a bolt 96 and nut 97 to the top surface 78 of conveyor slats 70. The end clip closes off the interior of the reinforced slat structure. The feed conveyor 30 includes a plurality of upright pins 102, discussed in more detail below, which mount the reinforcing slat 86 to the conveyor slat 70. See FIG. 4.

In the hopper conveyor 26, the reinforcing slats 86 are also connected to conveyor slats 70 by a nut 98 and a bolt 100 as shown in FIG. 5.

Figure 6:
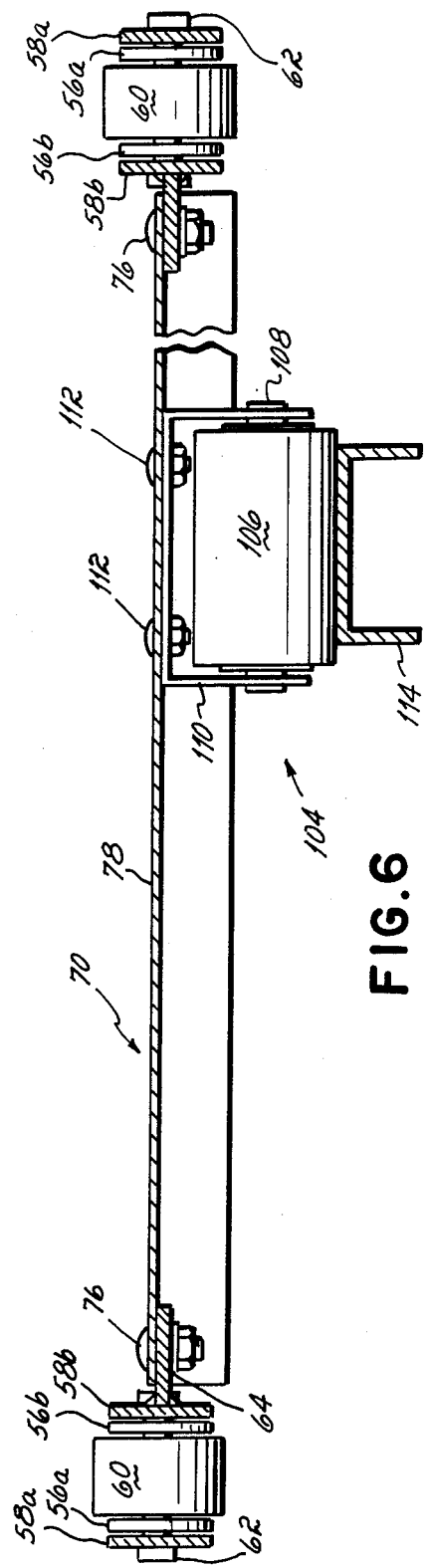
FIG. 6 is a side view in partial cross-section of a conveyor slat connected to a support roller, which is an alternative embodiment of the reinforcing slats shown in FIGS. 4 and 5.

In an alternative embodiment, shown in FIG. 6, the conveyor slats 70 may also be supported or stiffened by a roller 104. The roller 104 includes a cylinder 106 rotatable about a pin 108 which is connected to a bracket 110. The bracket 110 is mounted by bolts 112 to the top surface 78 of conveyor slats 70 so as to position the cylinder 106 beneath the conveyor slats 70 and atop a channel 114 mounted to the internal frame structure (not shown) of feeder 10 along the horizontal run of hopper conveyor 26 and the inclined run of feed conveyor 30. The cylinder 106 is maintained in engagement with channel 14 along such runs so as to support the conveyor slats 70 under the application of heavy loads from tobacco deposited thereon.

Figure 7:
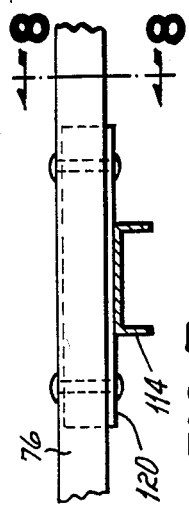
FIG. 7 is a side view, in partial cross-section, similar to FIG. 6 but showing another alternative embodiment of the slat of the invention.
Figure 8:
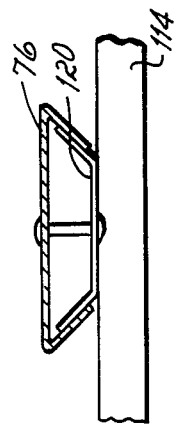
FIG. 8 is a cross-sectional view taken along lines 8—8 of FIG. 7.

In an alternative embodiment, FIGS. 7 and 8, the slats 70 are provided with short lengths of reinforcing slats 120 which serve as sliding supports of the slats on an elongated guide or runner such as channel 114. Either the roller of FIG. 6 or the slider of FIGS. 7 and 8 are generally used for feeders having slats 8 feet or over in length, or for any other length depending on anticipated load.

In order to conserve plant space, the overall length of tobacco feeder 10 is limited by providing a steeply inclined run between the pick-up station 28 and discharge station 24. To minimize slippage of the tobacco along the inclined run of slat conveyor 30, each of the slats 70 includes a plurality of upright pins 102. (FIG. 4.) The pins 102 are laterally spaced across the top surface 78 of slats 70, and are mounted thereto by a nut (not shown). As mentioned above, the pins 102 also function to mount reinforcing slats 86 to the conveyor slats 70 of feed conveyor 30.

In operation, tobacco is placed onto the hopper conveyor 26 at the input station 22. The hopper conveyor 26 carries the tobacco along an essentially horizontal rn to the pick-up station 28 at the base of feed conveyor 30. The pins 102 on each of the slats 70 of feed conveyor 30 engage the tobacco at the pick-up station 28 like a rake and move it up the steeply inclined run of feed conveyor 30 to the discharge station 24. The pins 102 prevent undue slippage of the tobacco from the inclined conveying surface 74 of feed conveyor 30.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A feed conveyor for use in a tobacco feeder for elevating tobacco product from a lower level hopper conveyor up an inclined conveying run to a higher level, said feed conveyor comprising:

a plurality of conveying slats each having outer ends and a flat tobacco conveying member defining a tobacco support surface lying in a conveying plane and integral forward and rearward slat stiffening legs bent from said tobacco conveying member and inwardly toward each other, the bends forming respecive forward and rearward longitudinally extending edges of said conveying slat and each said leg forming an included angle of less than 90° and greater than 0° with respect to said tobacco conveying surface;

a plurality of reinforcing slats, each having a horizontal member and integral forward and rearward legs bent outwardly away from one anotehr relative to said horizontal surface;

said reinforcing slats being disposed within said conveyor slats and extending substantially from one outer end thereof to another so that said legs of said reinforcing slats are disposed between and respectively engage said legs of said conveyor slats, and so that said horizontal member of said reinforcing slats are respectively spaced from and lie in a plane parallel to that of said tobacco conveying members of said conveyor slats, whereby increasing loads on said conveying slats increases resistance of said so combined conveying and reinforcing slats to further deflection;

drive chains having inclined runs, said conveying slats being mounted to said drive chains so that said longitudinal edges thereof are disposed in substantially constantly abutting relationship, said slat defining an inclined tobacco conveying run;

tobacco lifting means mounted on and extending outwardly from the tobacco support surface of said conveying slats for lifting tobacco product up said inclined conveying run when said incline is otherwise too steep for conveying tobacco up said inclined conveying run without said lifting means;

said lifting means connecting said reinforcing slats to respective ones of said tobacco conveying slats.

2. A tobacco feeder as in claim 1 wherein said lifting means comprise a plurality of pins mounted on and extending outwardly from said conveying slats for engaging and lifting tobacco.

3. A feeder for elevating material up a predetermined incline from a lower level to a higher level, said feeder including:

a feed conveyor having a plurality of conveying slats movable along said predetermined incline, each of said slats having outer ends and a conveying surface therebetween and having elongated forward and rearward transverse legs bent toward each other and away from said surface to form slat edges, said slats being mounted such that said edges are in substantially constantly abutting relationship to each other throughout movement of said slats;

a plurality of reinforcing slats, each having a horizontal member and integral forward and rearward legs bent outwardly away from one another relative to said horizontal surface;

means connecting said reinforcing slats to respectiive ones of said tobacco conveying slats;

said reinforcing slates being disposed within said conveyor slats and extending substantially from one outer end thereof to another so that said legs of said reinforcing slats are disposed between and respectively engage said legs of said conveyor slats, and said horizontal members of said reinforcing slats are spaced from and lie in a plane parallel to that of said tobacco conveying members of said conveyor slats, whereby increasing loads on said conveying slats increases resistance of said combination of conveying and reinforcing slats to further deflection.

4. A tobacco feeder as in claim 3, wherein load deflection of said conveying slats tend to move said legs of said respective slats closer toeghter in gripping contact such that said conveying and reinforcing slats cooperate together to produce increasing resistance to deflection in response to increasing loads thereon.

5. A conveyor slat means for supporting loads tending to deflect said slat means and comprising:

a conveying slat having a top conveying surface and legs depending therefrom;

said legs being bent toward one another forming longitudinal slat edges along said conveying surface;

said legs each forming an included angle, with said surface, or less than 90° and greater than 0°;

a reinforcing slat having a first surface parallel to said conveying surface and having parallel reinforcing legs bent from said first surface and outwardly away from one another;

said reinforcing slat and its legs extending along said conveying slat to areas proximate the ends thereof;

said reinforcing legs lying between, and in respective engagement with, respective ones of the legs of said conveying slat;

means connecting said reinforcing slat to said tobacco conveying slat;

wherein said conveying slat and said reinforcing slat form a box-like slat assembly;

wherein loads placed on said conveying slats deflect them;

and wherein said conveying and reinforcing slats interact, in response to said deflection, to produce an increasing resistance to deflection thereof.

* * * * *

UNITED STATES PATENT AND TRADEMARK OFFICE
CERTIFICATE OF CORRECTION

PATENT NO. : 4,718,541
DATED : January 12, 1988
INVENTOR(S) : Edwin L. Wilding

It is certified that error appears in the above-identified patent and that said Letters Patent is hereby corrected as shown below:

Column 2, line 29, "tot he" should be --to the--.

Column 3, line 9, "toward" should be --away from--.

Column 3, line 12, "slide" should be --slid--.

Column 6, line 53, "rn" should be --run--.

Column 7, line 18 "respecive" should be --respective--.

Column 7, line 25, "anotehr" should be --another--.

Column 8, line 12 "respectiive" should be --respective--.

Column 8, line 14 "slates" should be --slats--.

Column 8, line 28, "togehter" should be --together--.

Column 8, line 40 "or" should be --of--.

Signed and Sealed this

Twentieth Day of December, 1988

Attest:

DONALD J. QUIGG

Attesting Officer

Commissioner of Patents and Trademarks